April 12, 1932.   C. F. ANDERSON ET AL   1,853,395
IRONING MACHINE
Original Filed June 14, 1926    12 Sheets-Sheet 1

Inventors:
Carl F. Anderson
Rudolph W. Janda
By Brown, Boettcher Dienner
Atty's.

April 12, 1932.   C. F. ANDERSON ET AL   1,853,395
IRONING MACHINE
Original Filed June 14, 1926   12 Sheets-Sheet 2

Inventors:
Carl F. Anderson
Rudolph W. Janda
By Brown, Boettcher & Dienner
Attys

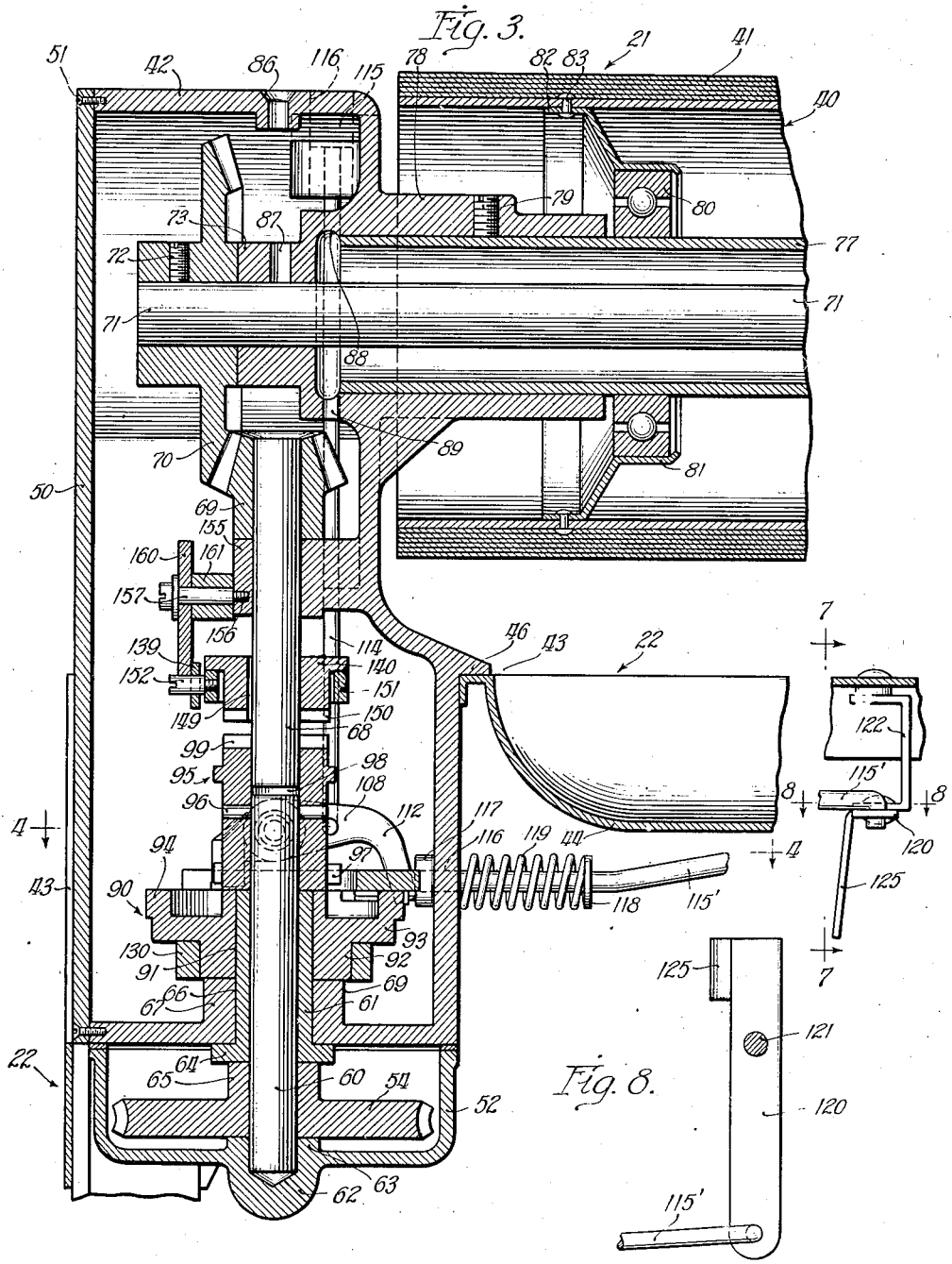

April 12, 1932.   C. F. ANDERSON ET AL   1,853,395
IRONING MACHINE
Original Filed June 14, 1926   12 Sheets-Sheet 4
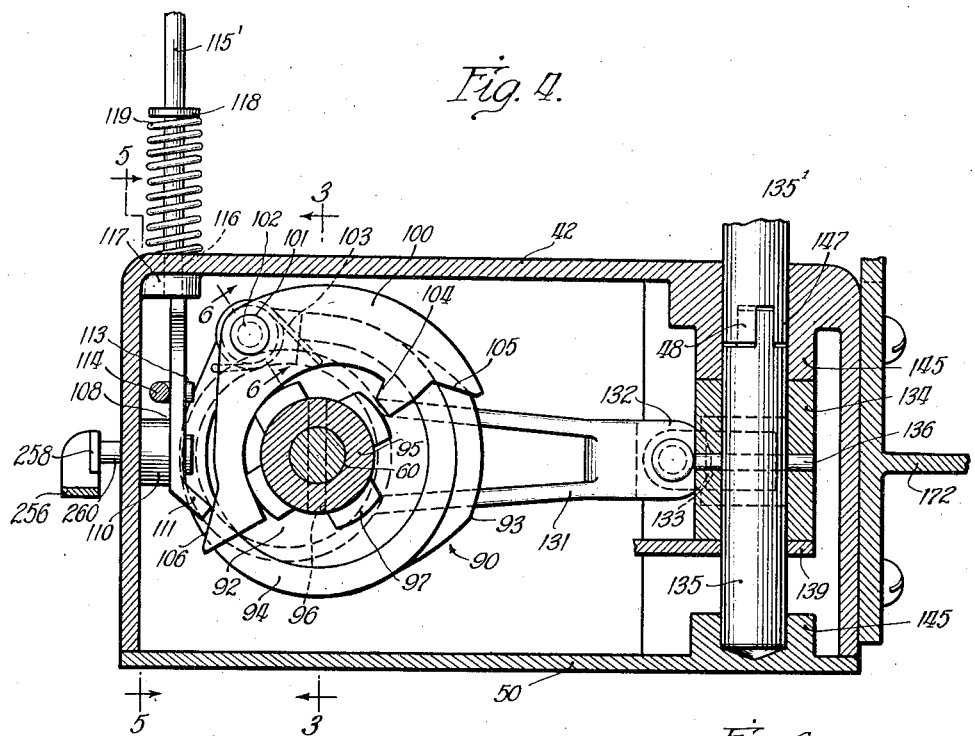
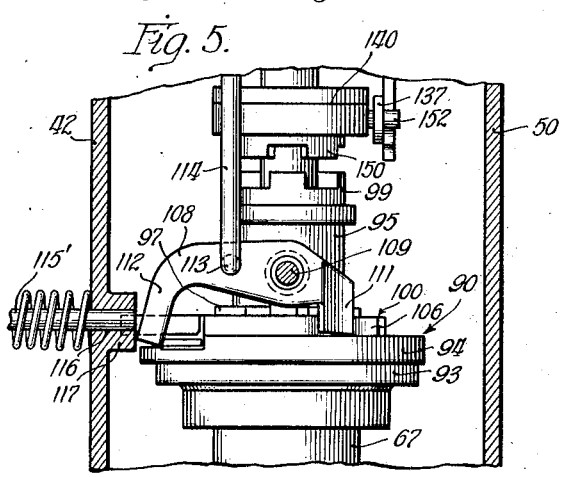
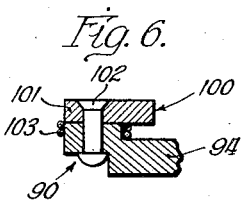
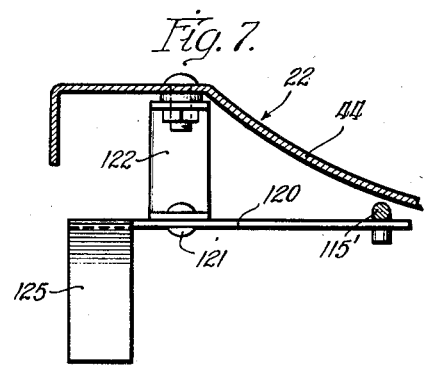
Inventors:
Carl F. Anderson
Rudolph W. Janda
By Brown, Boettcher & Dienner
Atty's

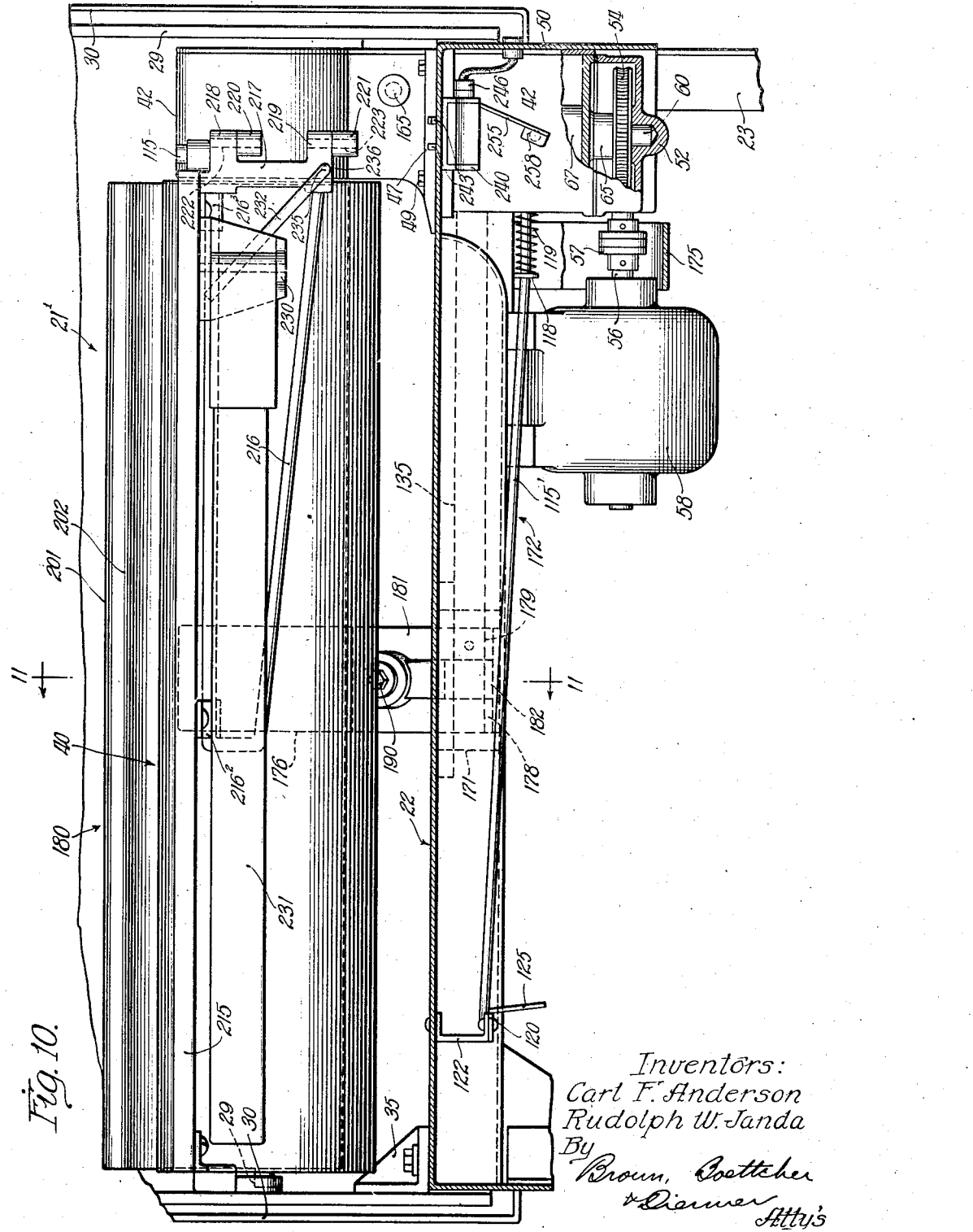

April 12, 1932.  C. F. ANDERSON ET AL  1,853,395
IRONING MACHINE
Original Filed June 14, 1926   12 Sheets-Sheet 6
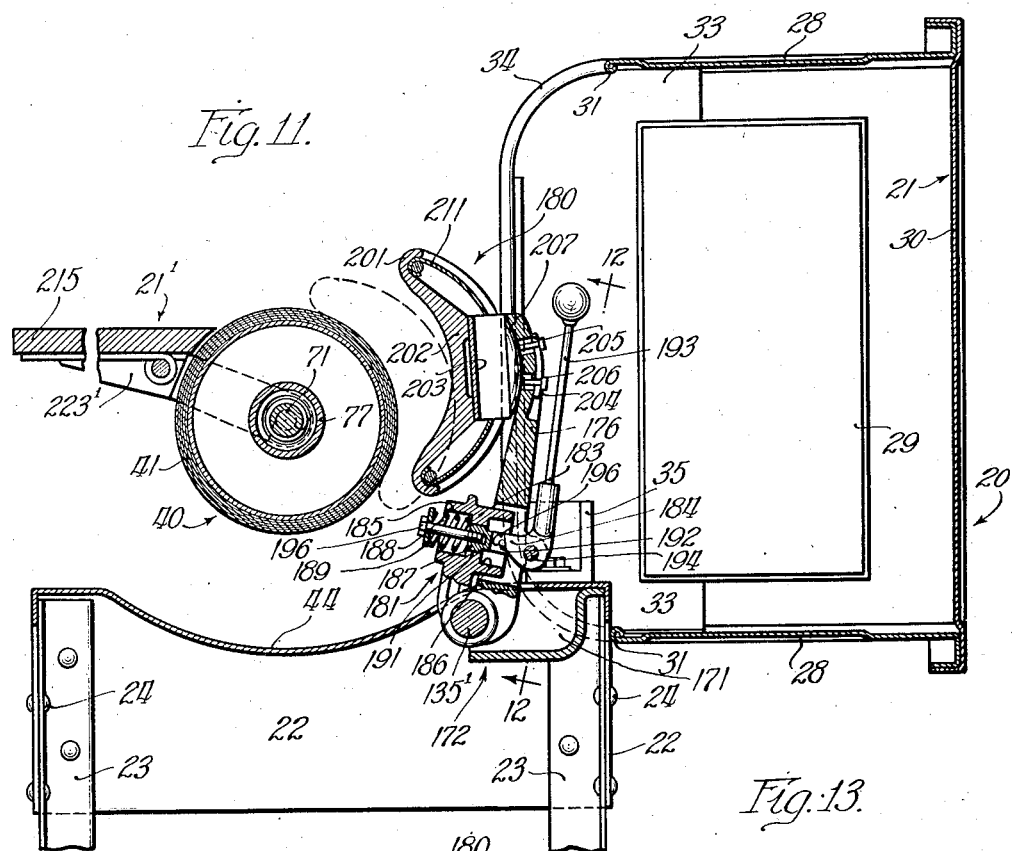
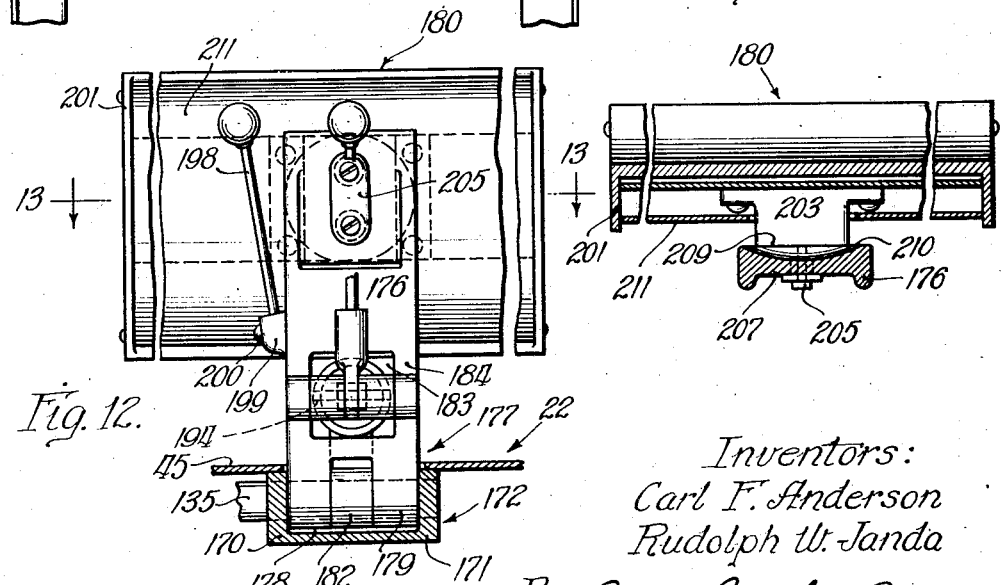
Inventors:
Carl F. Anderson
Rudolph W. Janda
By Brown, Boettcher Dienner
Atty's.

April 12, 1932. C. F. ANDERSON ET AL 1,853,395
IRONING MACHINE
Original Filed June 14, 1926  12 Sheets-Sheet 7

Inventors:
Carl F. Anderson
Rudolph W. Janda
By Brown, Boettcher & Dienner
Atty's

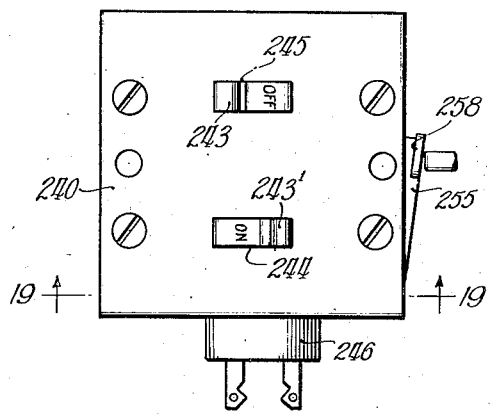
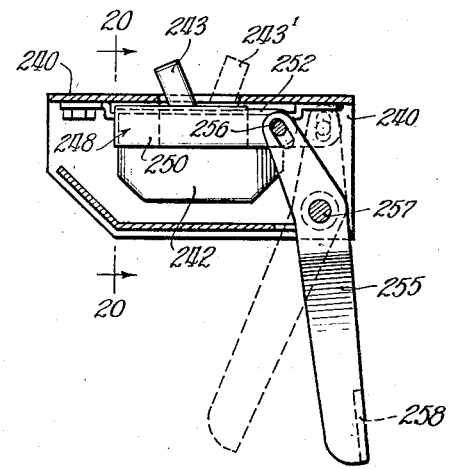
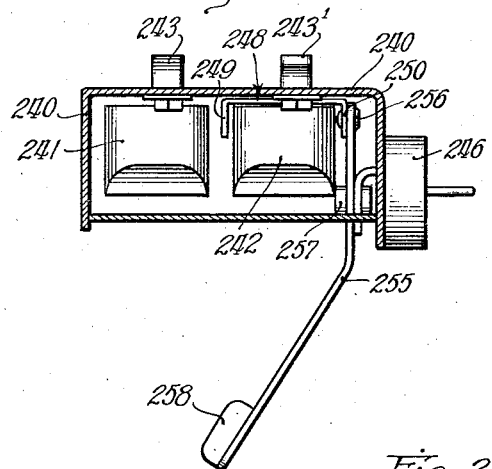
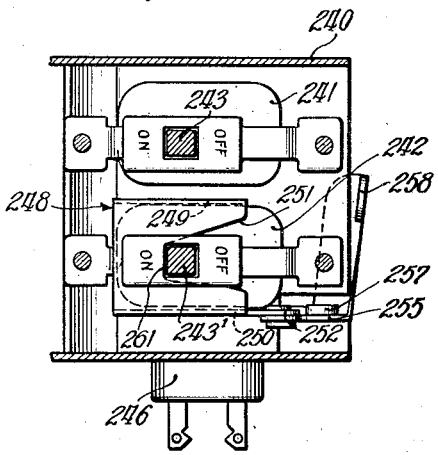
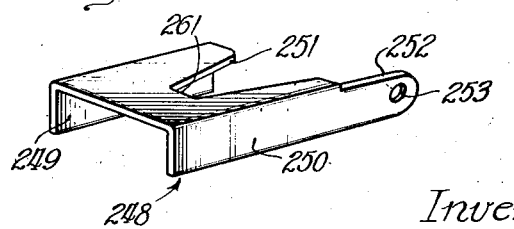

April 12, 1932. C. F. ANDERSON ET AL 1,853,395
IRONING MACHINE
Original Filed June 14, 1926 12 Sheets-Sheet 9

Inventors:
Carl F. Anderson
Rudolph W. Janda
By Brown
Boettcher
Dienner
Atty's

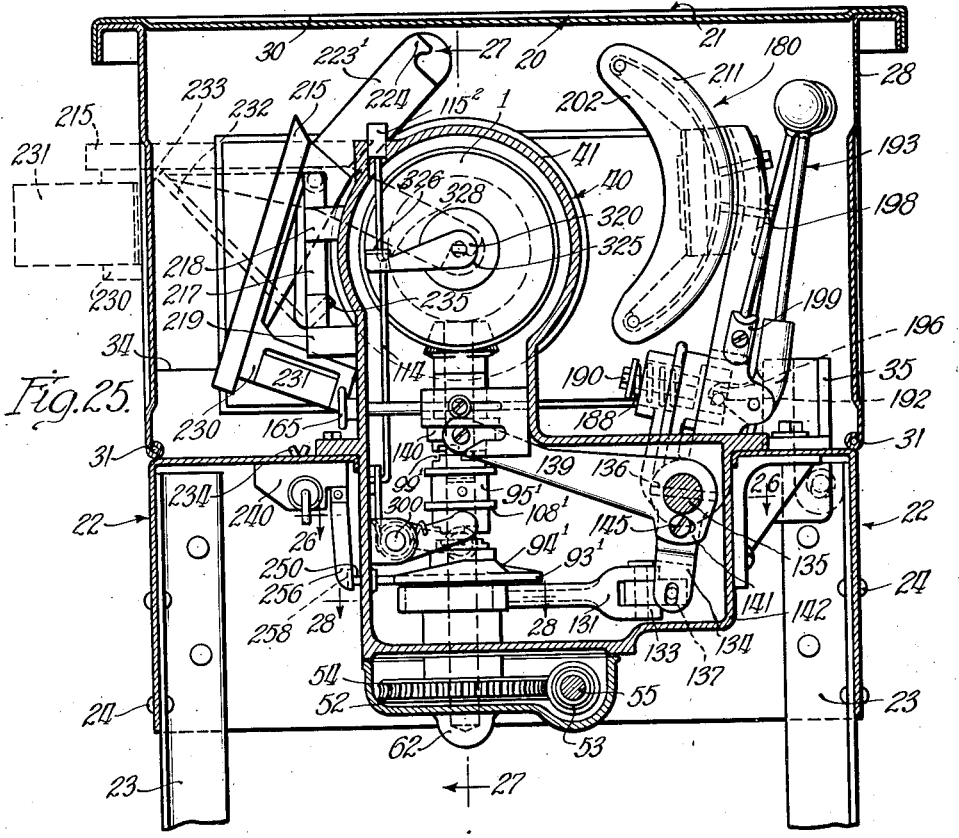

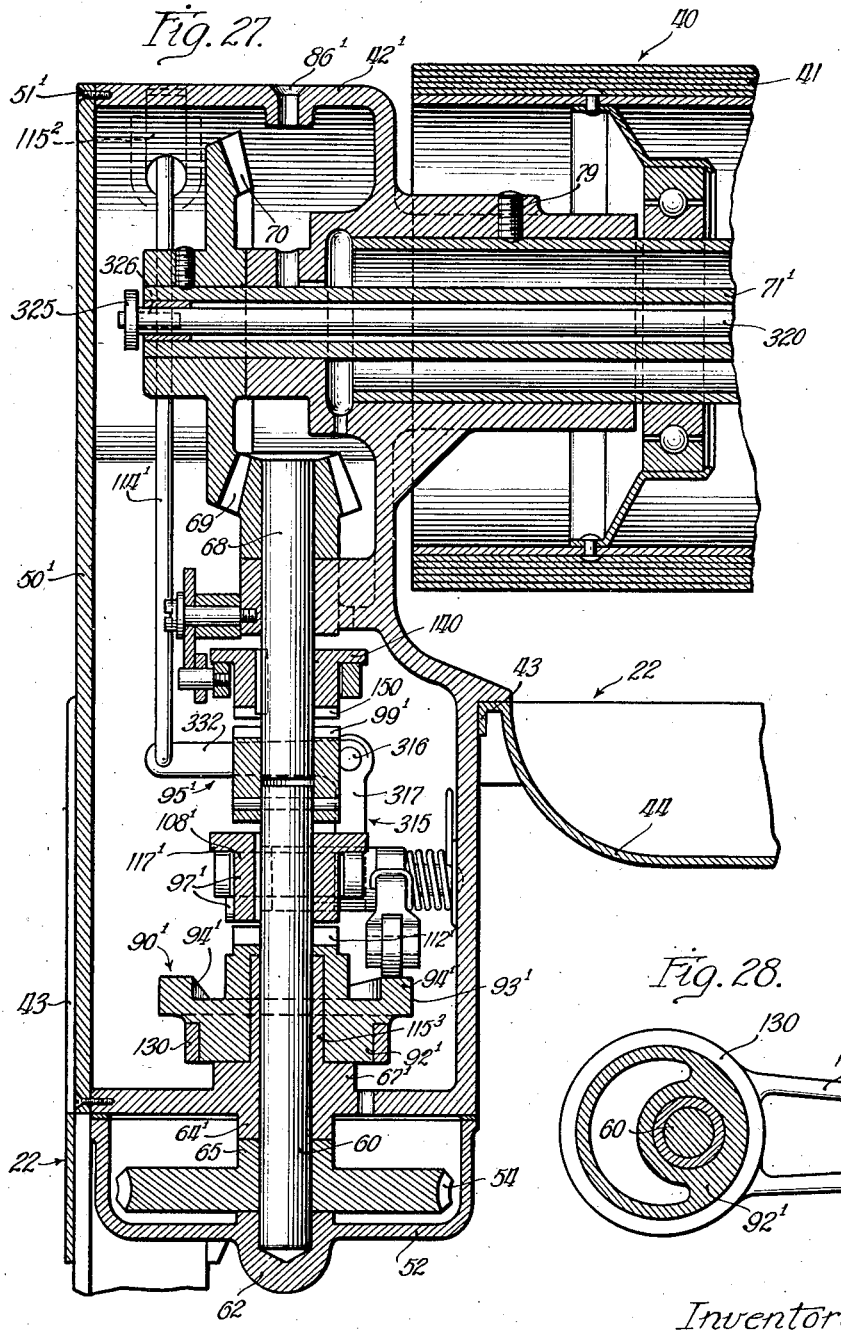

April 12, 1932.  C. F. ANDERSON ET AL  1,853,395
IRONING MACHINE
Original Filed June 14, 1926   12 Sheets-Sheet 12
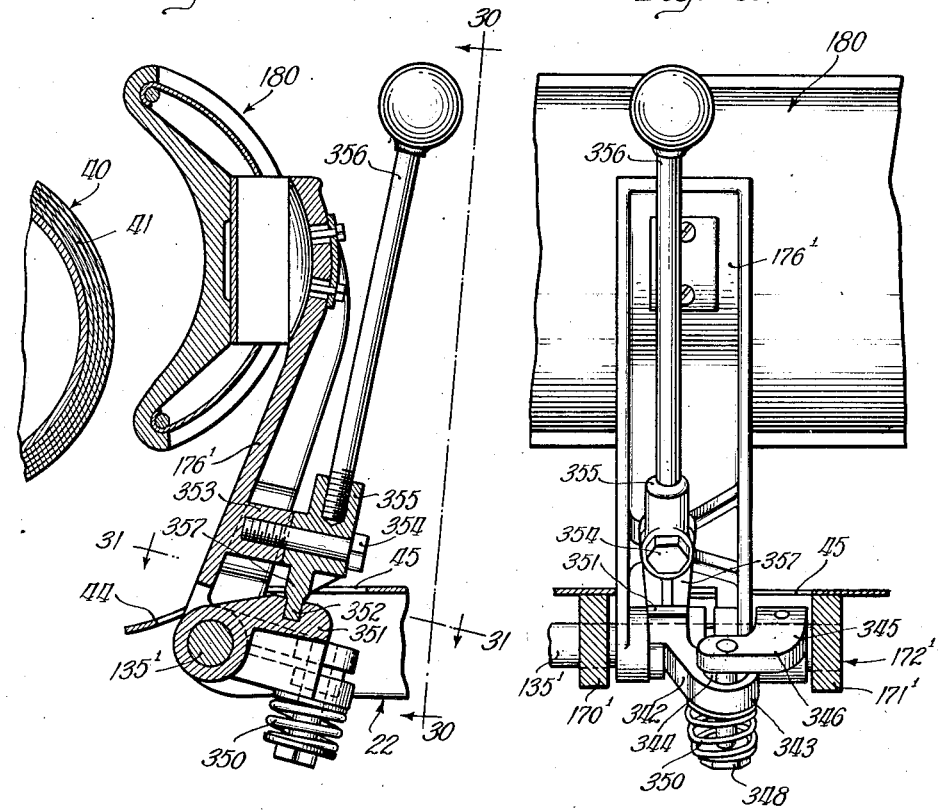
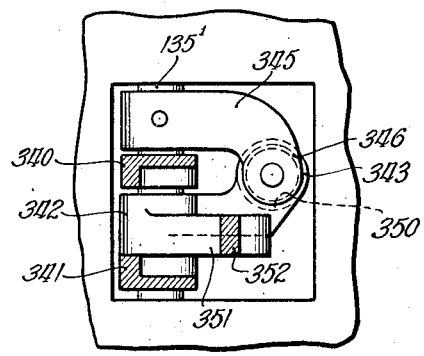
Inventors:
Carl F. Anderson
Rudolph W. Janda
By Brown, Boettcher & Dienner
Attys Patented Apr. 12, 1932

1,853,395

UNITED STATES PATENT OFFICE

CARL F. ANDERSON, OF BROOKFIELD, AND RUDOLPH W. JANDA, OF CICERO, ILLINOIS, ASSIGNORS TO CONLON CORPORATION, OF CICERO, ILLINOIS, A CORPORATION OF ILLINOIS

IRONING MACHINE

Original application filed June 14, 1926, Serial No. 115,820. Divided and this application filed December 20, 1927. Serial No. 241,333.

Our invention relates in general to ironing mechanism and more particularly to a novel combination table and ironing machine construction.

In accordance with the general features of our invention, we have provided a novel combination table and ironing machine construction which is not only compact and rigid, but presents an improved ironing machine, which may be operated with facility and which is capable of performing the ironing operation with maximum efficiency.

A feature of our invention resides in the provision of an improved and simple operating mechanism for the ironing roll and shoe.

Another feature of our invention is the provision of improved mechanism for releasing the shoe from an operative position whenever it is desired. We provide a manually operable lever for releasing the shoe from the operating shaft, whereby it is free to fall or gravitate into an unengaged position. Incidentally, we also provide a novel resilient construction for urging the shoe towards the roll when it is in engagement therewith, so as to enable the shoe to adjust itself in accordance with the thickness of the material passed between the roll and the shoe.

Still another feature of our invention pertains to the novel mounting and drive we have provided for the revolvable ironing roll. The roll is adapted to rotate on an antifrictional support which insures a smoothness of movement on the part of the revolving roll.

A further feature of our invention is the provision of novel manually operable means for controlling the operation of the ironing machine. We preferably provide leverage under the table adapted to be engaged by the operator's knee to control the operation of the machine.

A further feature of our invention is the provision of mechanism associated with the switch controlling the operation of the roll for automatically rendering the switch ineffective to turn off the power for the purpose of stopping the turning of the roll when the shoe is in engagement therewith.

A still further feature of our invention is the provision of a novel pivotal mounting for the table top, whereby it may be swung about its support to afford access to the ironing machine normally enclosed thereby.

A still further feature of our invention is the provision of manually operable means for rendering the mechanism, adapted to actuate the roll, ineffective when it is desired to momentarily move the shoe into engagement with the roll for the purpose of pressing some garment, such as a coat, or the like, where a feed is not desired.

Other objects and advantages of our invention will more fully appear from the following detailed description, taken in connection with the accompanying drawings, which illustrate several embodiments thereof and, in which:—

Figure 3 is a fragmentary sectional view taken on the line 3—3 of Figure 2, looking in the direction indicated by the arrows;

Figure 4 is a sectional view taken on the line 4—4 of Figure 3, looking downwardly;

Figure 5 is a fragmentary sectional view taken on the line 5—5 of Figure 4;

Figure 6 is a sectional view taken on the line 6—6 of Figure 4, looking upwardly;

Figure 7 is a fragmentary sectional view taken on the line 7—7 of Figure 3, looking in the direction indicated by the arrows, and illustrating in detail a manual operating member for setting the ironing machine into operation;

Figure 8 is a fragmentary view, partly in section, taken on the line 8—8 of Figure 3 looking downwardly;

Figure 10 is a view taken on substantially the line 10—10 of Figure 1, looking in the direction indicated by the arrows;

Figure 11 is a view taken on the line 11—11 of Figure 10, partly in section, and illustrating the operating mechanism associated with the ironing shoe;

Figure 12 is a view taken on the line 12—12 of Figure 11 looking to the left;

Figure 13 is a view taken on the line 13—13 of Figure 12 looking downwardly;

Figure 18 is a plan view of the switch and associated mechanism for controlling the operation of the ironing machine;

Figure 19 is a sectional view taken on substantially the line 19—19 of Figure 18, looking upwardly, and illustrating the control lever associated with the switch;

Figure 20 is a sectional view taken on the line 20—20 of Figure 19;

Figure 21 is a view similar to Figure 18 with the top plate removed;

Figure 22 is a perspective view of the sliding element connected with the end of the switch lever, illustrated in Figures 19 and 20;

Figure 25 is a view taken on substantially the line 25—25 of Figure 23, looking in the direction indicated by the arrows;

Figure 26 is a view partly in section taken on the line 26—26 of Figure 25, looking downwardly;

Figure 27 is a vertical sectional view taken on substantially the line 27—27 of Figure 25;

Figure 28 is a sectional view taken on the line 28—28 of Figure 25;

Figure 29 is a sectional view of a modified form of mounting for the ironing shoe;

Figure 30 is a view partly in section taken on the line 30—30 of Figure 29; and

Figure 31 is a sectional view taken on the line 31—31 of Figure 29.

Figure 1:
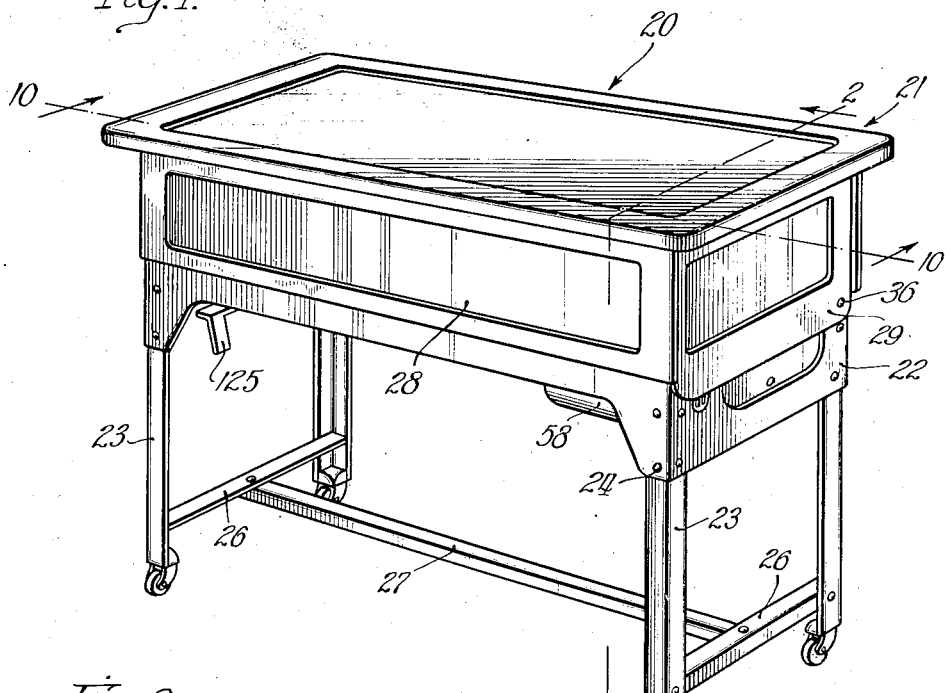
Figure 1 is a perspective view of a combination table and ironing machine embodying the features of our invention.

This application is a division of our copending application for ironing machine, Serial No. 115,820 filed June 14, 1926, which has since eventuated into Patent 1,656,656, granted on January 17, 1928.

Referring now to the drawings in detail, in which like reference numerals designate similar parts throughout the several views, 20 denotes generally a table (Figure 1) in which is housed our novel machine mechanism designated generally by the reference character 21' (Figure 10). The table 20 includes a top or cover 21 pivotally attached to a machine bed or support 22 adapted to enter into a telescoping relationship with the table top or cover 21. The support 22 is carried by a plurality of angle iron legs 23, preferably four in number. The upper end of each leg 23 is secured to the corresponding corner of the support 22 by any suitable fastening means, such, for example, as bolts 24. The lower end of each leg 23 has connected thereto a caster 25. Each pair of legs 23 is connected by a cross member 26, and the two cross members 26 are connected by a longitudinal tie rod 27.

The table cover 21 comprises a pair of sides 28 and a pair of ends 29. The sides 28 are connected by the ends 29 positioned intermediate the said sides. Secured to the top of the sides and ends is a table top 30, which may be fastened thereto by any suitable means. The ends, the sides, and the top are preferably of a panel type construction, so as to furnish the table cover 21 with maximum rigidity. Then, too, this panel construction enhances the appearance of the table 20.

Figure 2:
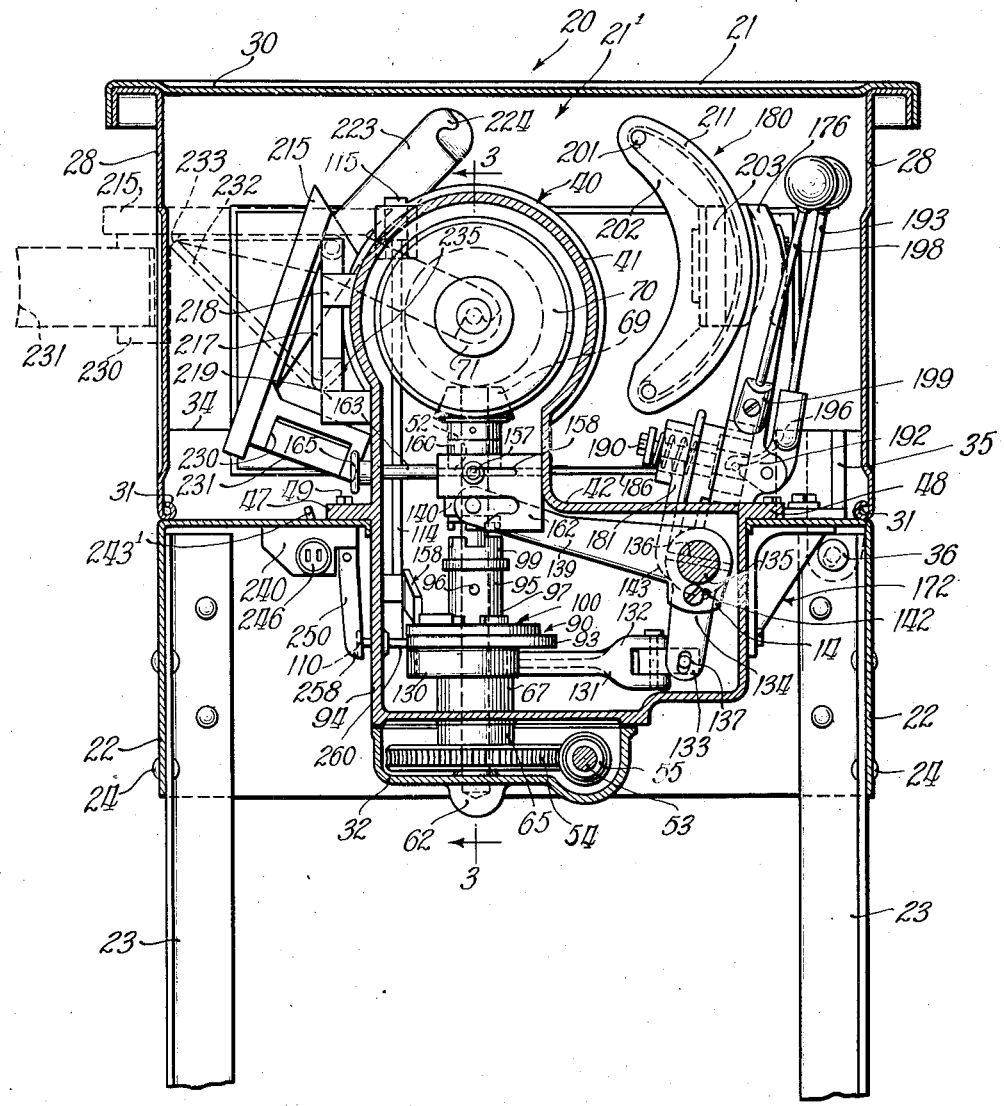
Figure 2 is a fragmentary sectional view taken on substantially the line 2—2 of Figure 1, looking in the direction indicated by the arrows.
Figure 14:
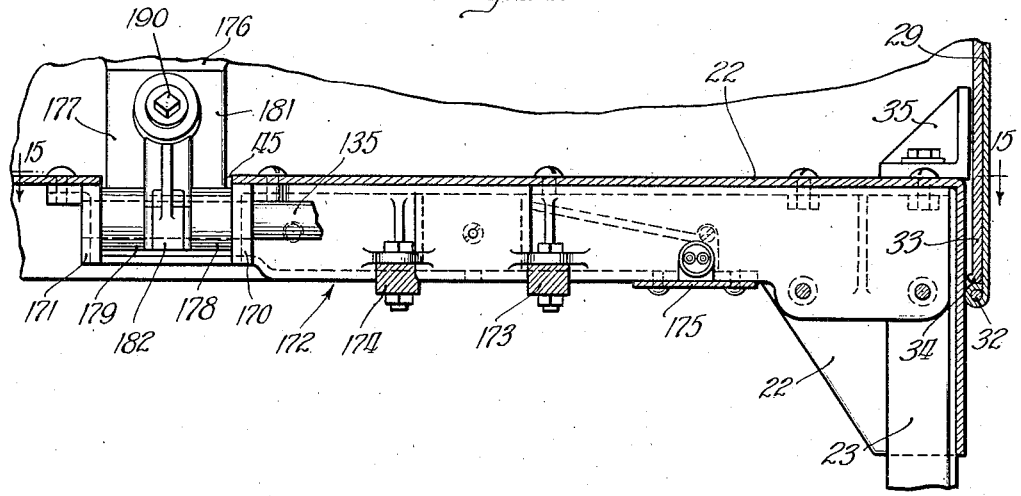
Figure 14 is a view partly in section of the reenforcing member or casting associated with the machine bed, as shown in Figure 9.
Figure 15:
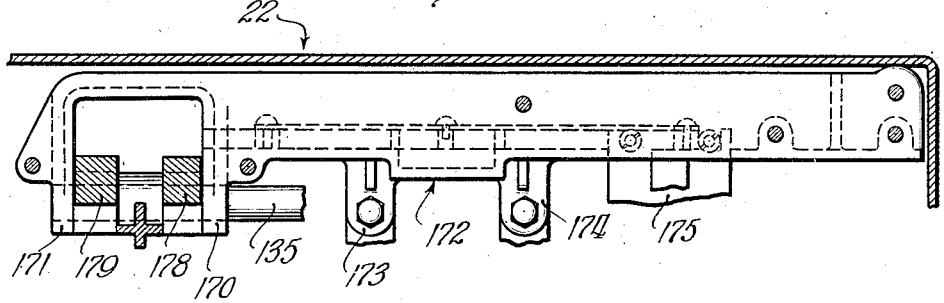
Figure 15 is a view partly in section taken on the line 15—15 of Figure 14.

The lower edges of the sides 28 are preferably beaded, as indicated at 31 (Figure 2). The lower edges of the ends 29 are also beaded, as indicated at 32 (Figure 14). Also, secured to each end 29 is a reenforcing panel 33 provided with an inwardly turned edge 34. The edge 34, as will be more fully explained hereinafter, is adapted to co-operate with an angular member 35 secured to the top of the support 22 to limit the swinging movement of the table cover 21 about its pivots. It is to be understood that two of these angular members 35 are secured to the top of the machine bed 22, one for each end 29. Each end 29 is pivoted at 36 to a portion of the support 22. The cover 21 is adapted to be swung about these pivots 36 into a position, such as that illustrated in Figure 11. When the table cover 21 is the vertical position, illustrated in Figure 11, access may be had to the ironing machine mechanism 21'. Also, the movement of the table cover 21 about the pivot 36 is limited by the edges 34 of the ends 29 coming into engagement with the angle members 35 secured to the top of the support. Of course, it is to be understood that even if no provision was made for the angle members 35, the beaded edge 31 of a side 28 would abut the associated side of the support 22, as is evident from Figure 11. By providing the angular member 35, we limit the movement of the table top about its pivot without the necessity of its edge coming into contact with the polished side of the support and thus prevent any possibility of the surface of the support from becoming marred or scratched thereby.

As will be noted from Figure 1, the cover 30 is of box-like construction and serves, when in closed position, to cover the ironing shoe and roll, and associated parts, and also provides a table top well adapted for use in the kitchen, or for other purposes, as clearly illustrated in Fig. 11. When the cover 30 is turned into open position it is disposed immediately in rear of the hot shoe and acts as a guard to effectually prevent contact with the shoe by a person in rear of, or at either end of, the machine. With the cover 30 in this position, its open face is directly exposed to the hot shoe, whereby the heat radiated from the shoe heats the interior thereof and ironed articles, still damp, may be placed therein for quick and effective drying out. It is also to be noted that the front wall of the cover, when in raised position, provides a support or shelf upon which articles may be placed in ready accessibility to the operator.

Figure 16:
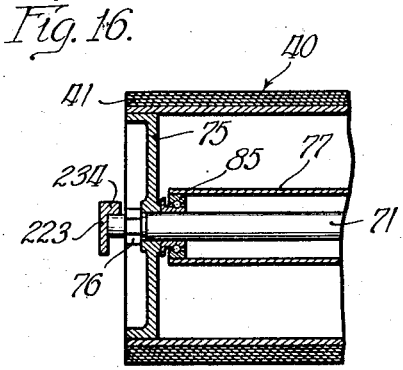
Figure 16 is a sectional view taken through the left hand end of the roll illustrated in Figure 10.

In Figure 10 we have illustrated fragmentarily the upper part of our combination construction with the table cover 30 tilted back to expose the ironer mechanism. That is to say, the top 30 is swung to a position such as that illustrated in Figure 11. The ironer mechanism includes a roll 40 which extends longitudinally of the table. This roll 40, as best illustrated in Figure 16, is provided with a padded surface 41 which is typical of such ironing rolls. Associated with one end of the roll 40 is a casing or housing 42 for enclosing the operating mechanism of the ironing roll.

Figure 9:
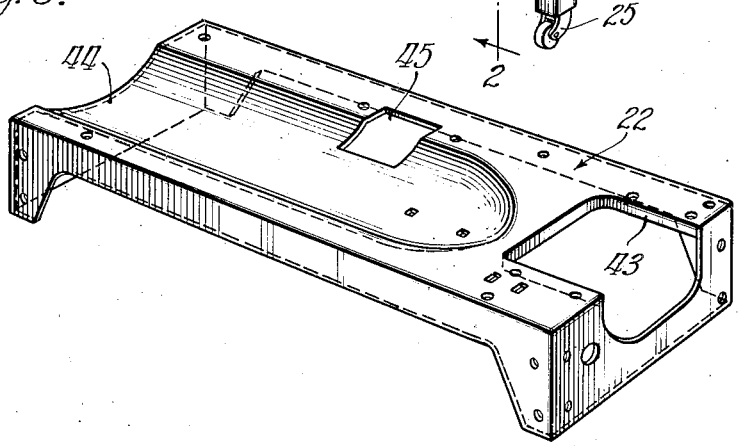
Figure 9 is a perspective view of the machine bed or support which carries the ironing machine mechanism.

This casing 42 (Figure 3) extends through an opening 43 in the support 22. By referring to Figure 9, it will be evident that the aperture 43 is substantially rectangular in shape and is disposed at one end of the support 22. Also, it will be apparent that the support 22 is provided with an arcuate shaped depression 44 which extends longitudinally of the support. Intermediate its ends, the support 22 is provided with a rectangular opening 45, the purpose of which will be more fully described hereinafter. The casing 42 is provided with a flange 46 which extends over a portion of the support 22 adjacent the arcuate shaped depression 44 (Figure 3). Also, the casing 42 is provided with a pair of side flanges 47 and 48 (Figure 2), which are secured to the top of the support 22 by means of bolts 49. The casing 42 is provided with a detachable cover plate 50 (Figure 3) which is preferably secured to the walls of the casing by means of screws 51. By removing this cover plate 50 access may be had to the operating mechanism disclosed inside of the casing.

Secured to the lower part of the casing 42, in any desirable manner, is a gear casing or housing 52 (Figures 2 and 3). This housing 52, as is evident, is disposed below the top of the support 22. Disposed in this gear casing 52 is a worm 53 adapted to at all times mesh with a worm wheel 54. The worm 53 is mounted upon a shaft 55 (Figures 2 and 10), which shaft is connected to a motor shaft 56 by means of a coupling 57. The motor is designated generally by the reference character 58 and may be of any conventional or suitable construction. The single motor 58 serves to operate all of the ironing machine mechanism, as will be apparent from the description to hereinafter follow.

The worm wheel 54 is splined or keyed to a vertical shaft 60, which extends upwardly through a vertical sleeve 61. The lower end of the vertical shaft 60 is journalled at 62 in the bottom of the gear housing 52. The bottom of the housing 52 is provided with a boss 63 which encircles the lower end of the shaft 60, and the concentric sleeve 61 is provided with an enlarged end portion 64 at its lower end. The worm wheel 54 is provided with a hub 65 and encircles that portion of the shaft 60 intermediate the enlarged portion 64 and the boss 63 in the housing 52 (Figure 3).

The sleeve 61, as previously mentioned, is telescoped by the vertical shaft 60 and extends upwardly through an opening 66 in the bottom of the casing 42. Also, it should be noted, that the bottom of the casing 42 is provided with a boss 67 which serves as a bearing for the sleeve 61. Positioned within the casing 42, and in axial alignment with the shaft 60, is a second shaft 68 which has secured to its upper end a bevel gear 69 (Figure 3). The bevel gear 69 is adapted to mesh at all times with a bevel gear 70 secured to a horizontal shaft 71 by means of a set screw 72.

The longitudinal shaft 71 serves to drive the roll 40, as will now be described. One end of this shaft 71 is journaled in an enlarged portion 73 formed integral with the casing 42. The other end of the shaft 71 is secured to a plate 75 (Figure 16), which plate is fastened to the inner periphery of the roll 40. Thus it will be apparent that power is transmitted to one end of the shaft 71, and power is transmitted from the other end of the shaft 71 to the roll 40 to revolve the same. It will be observed from Figure 16 that a nut 76 is threaded upon the end of the shaft 71 associated with the plate 75. This nut 76 abuts the plate 75 and maintains the shaft in position.

Surrounding the shaft 71 is a concentric sleeve 77, one end of which telescopes an extension 78 formed integral with the casing 42. This extension is secured to the telescoping sleeve 77 by means of a set screw 79. The extension 78 (Figure 3) projects into the inside of the roll 40 and serves to maintain one end of the sleeve 77 in a proper position with respect to the shaft 71. Disposed about the sleeve 77 adjacent the extension 78 is a ball bearing unit 80 held in place by means of an annular member 81 positioned within the roll 40. The annular member 81 is provided with an annular flange 82 which is contiguous with the inner periphery of the roll 40 and is preferably secured thereto by means of rivets 83. This ball bearing unit 80 serves as a ball bearing support for one end of the roll 40 and insures a smooth movement on the part of the roll.

The other end of the sleeve 77 (Figure 16) has disposed intermediate it and the shaft 71 a ball bearing unit 85, the inner race of which abuts the surface of the plate 75. This ball bearing unit 85 serves as a ball bearing support for the free end of the shaft 71.

The housing or casing 42 is provided with an opening 86 through which suitable lubricant may be projected into the casing 42. The enlarged portion 73 of the casing 42 is provided with an oil opening 87, preferably in alignment with the oil opening 86. Obviously, when oil is fed into the casing through the opening 86, it will drop into the opening 87 in the portion 73. This oil recess 87 serves to feed the lubricant to the revolvable shaft 71. Also, the casing 42 is provided with an annular groove or recess 88 surrounding the shaft 71 which communicates with a small opening 89. It will be evident that the oil will pass through the opening 89 and down onto the operating mechanism in the lower part of the casing 82.

Referring now to Figure 3, it will be apparent that the sleeve 61 extends upwardly through an opening 91 in a member designated generally by the reference character 90. This member 90 includes an eccentric portion 92, a cam portion 93, and a top portion 94. The member 90 is not secured or connected to the shaft 60, but loosely surrounds the sleeve 61. Surrounding the shaft 68 above the member 90 is a clutch element 95 which is secured to the shaft 60 by means of a pin 96. The lower end of the element 95 is provided with a plurality of clutch teeth 97, preferably four in number (Figure 4). The shaft 60 extends only part way into the bore 98 of the element 95, whereas the lower end of the shaft 68 extends into the remaining portion of the bore 98. The lower end of the shaft 68, however, is not secured to the element 95, as is obvious from Figure 3. The upper end of the element 95 is provided with a plurality of clutch teeth 99, the purpose of which will be more fully described hereinafter.

The member 90 is disposed immediately over and on top of the boss 67 of the casing 42 and the clutch element 95 is positioned on top of the member 90. We shall now proceed to describe in detail the mechanism for operatively connecting the driven clutch element 95 with the member 90. This mechanism is clearly illustrated in Figures 3, 4 and 5.

Disposed on top of the top portion 94 of the member 90 is a clutch finger 100 having an aperture 101 surrounding a pivot pin 102 secured to the top portion 94 (Figure 4). The clutch finger 100 is at all times urged in the direction indicated by the arrow by a spring 103 disposed about the pin 102. One end of this spring is preferably secured to the top portion 94 and the other end of the spring is preferably secured to the clutch finger 100. The clutch finger 100 is provided at one end with a clutch tooth 104 adapted to engage with the clutch piece 97 on the lower end of the clutch element 95. The end of the clutch finger 100 associated with the tooth 104 is provided with a tapered edge 105, the purpose of which will be obvious from the description hereinafter to follow. The clutch finger is preferably arcuate in shape and is adapted to be moved about its pivot pin 102. The other end of the clutch finger 100 is provided with a tapered portion or edge 106, as best shown in Figure 4. The clutch finger, as illustrated in Figure 4, is in a disengaged position and the spring 103 is rendered ineffective to urge the finger 100 into engagement with the clutch piece 97 through the means of a trip lever 108, which will now be described.

The trip lever 108 is pivotally mounted upon a pivot pin 109 secured at 110 to the side of the casing 42 (Figures 4 and 5). One end of the trip lever 108, designated by the reference character 111, is bent into a lateral extension, which extension 111 is adapted to engage the tapered edge 106 of the clutch finger 100, as is obvious from Figure 4. The other end of the trip lever 108 is bent into a dog-like portion 112, which extends downwardly, as shown in Figure 5.

Secured to the lever 108 intermediate its ends is an end of a button rod 114. We have designated the pivotal connection between the rod 114 and the lever 108 by the reference character 113 in Figure 5. This button rod 114 extends upwardly through the casing 42 and is provided at its upper end with a button portion 115 (Figure 3). The button 115 extends through an aperture 116 in the top of the casing 42 and is adapted to be depressed manually to set the operating mechanism of the ironing machine into action.

Associated with the dog end 112 of the trip lever 108 is an end of a rod 115'. This end of the rod 115' extends through an aperture 116' in the wall of the casing 42 and through a boss 117 formed integral with the wall of the casing 42. This rod 115' is adapted to be moved into engagement with the dog end 112 of the trip lever 108 to move this end of the lever downwardly and to thus move the lateral extension 111 out of co-operation with the trip finger 100 to permit the spring 103 to become effective. Secured to the rod 115′ is a shoulder or washer 118 between which, and the outer wall of the casing 42, is a compression spring 119 for normally urging the rod 115′ in a direction away from the casing 42. The rod 115′, as best shown in Figure 10, extends longitudinally of the support 22 and is disposed immediately thereunder. The opposite end of the rod 115′ is connected to a lever 120 (Figures 7 and 10). The lever 120 is pivoted intermediate its ends at 121 to a bracket 122 secured to the under side of the support 22 adjacent the arcuate depressed portion 44. It will be noted from Figures 3 and 7 that one end of this lever 120 is secured to an end of the rod 115′ and the other end of the lever 120 is provided with a lateral extension 125. This extension 125 is adapted to be engaged by the knee of the operator when it is desired to set the ironing machine into operation.

Now, from the foregoing, it will be evident that we have provided two mechanisms for moving the lateral extension 111 of the trip lever 108 out of co-operation with the finger 100. When either of these mechanisms are operated, the spring 103 functions to urge the tooth 104 of the finger 100 into co-operation with the clutch piece 97 on the element 95. This will result in the member 90 being turned one-half of a revolution, at which time the edge 105 of the other end of the finger 100 will be engaged by the extension 111 of the trip finger 108. That is to say, by the time the member 90 has made a half revolution, the trip finger 108 will be restored to its original position due to gravity, the end of the lever 108 associated with the extension 111 being made heavier than the dog end 112. Upon the edge 105 being engaged by the extension 111, the tooth 104 will be disengaged from the clutch piece 97, thus disconnecting the member 90 from the element 95.

The eccentric portion 92 of the member 90 is surrounded by a strap portion 130 formed integral with one end of a lever or arm 131. In Figure 28 we have illustrated the manner in which the eccentric portion is surrounded by the strap 130 of the lever 131. This particular connection between the eccentric and the lever 131 is exactly the same in both modifications of our invention. It is, therefore, believed that the illustration of Figure 28 will suffice for both forms of the invention.

The other end of the lever 131 is forked, as indicated at 132. Pivotally secured to this forked end 132 of the lever 131 is an element 133 which is pivotally attached to the free and lower end of an arm 134. The arm 134 is secured to a longitudinal shaft 135 by means of a pin 136. The shaft 135, as will become more apparent hereinafter, is the operating shaft which controls the actuating of an ironing shoe. The lower end of the arm 134 is preferably bifurcated so as to enable it to receive the end of the element 133, which is pivotally attached thereto by means of a pin 137. The eccentric portion 92 is of such a construction that upon one-half a revolution of the member 90, the shaft 135 will be turned in one direction, and upon a second half revolution of the member 90 the shaft will be returned to its former position. This action will be more fully explained hereinafter.

Loosely mounted on the shaft 135, as is obvious from Figure 4, is one end of an arm 139. This arm 139 is substantially flat and, as best shown in Figure 2, has its other end associated with a movable clutch element 140 loosely mounted on the shaft 68. Referring to Figure 2, the arm 139 has a downwardly extending portion 141 provided with an elongated aperture 142. Extending through this aperture 142 is a screw 143 threaded into the arm 134. Thus it will be seen that we have provided a lost motion connection between the arm 139 and the arm 134. The purpose of this connection is to enable only part of the movement of the arm 134 to be effective in moving the arm 139. In other words, a greater degree of movement on the part of the shaft 135 is desired than on the part of the arm 139.

The shaft 135 (Figure 4), is journalled at one end in a boss 145 formed integral with the cover 50. The other end of the shaft 135 is journalled in a boss 146 formed integral with the casing 42. The shaft 135 is preferably broken intermediate its ends as indicated at 147, that is to say, the parts comprising the shaft 135 are connected at 147 by means of a clutch-like connection 148. This arrangement enables the casing 42 and its part of the shaft 135 to be readily disconnected from the other part of the shaft 135 without necessitating the complete tearing down of the machine. The part of the shaft 135 extending out of the casing 42, we have designated by the reference character 135′. This part of the shaft is clearly illustrated in Figure 10, and extends in a longitudinal position immediately under the top of the support 22. Its purpose will be described later.

The clutch element 140 is splined upon the shaft 68 by means of a key 149. This element is provided with a plurality of clutch teeth 150 adapted to co-operate with the clutch teeth 99 on the element 95. It will be obvious that by moving the element 140 into engagement with the element 95, a driving connection will be established between the shaft 60 and the shaft 68, thus resulting in a rotation of the roll 40. The arm 139 is the medium by which the clutch element 140 is lowered and raised. Loosely mounted around the element 140 (Figure 3), is an annular band 151. Threaded into this band 151 is a screw 152 having an elongated head portion. One end of the arm 139 (Figures 2 and 3) is provided with an aperture 153 for receiving the head of the screw 152. Now, obviously, upon the lowering of the band 151 by the arm 139, the clutch element 140, due to gravity, will be lowered therewith. Conversely, upon the raising of the band 151 by the arm 139 the element 140 will be raised therewith out of engagement with the clutch element 95.

The casing 42 (Figure 3) is provided with an extension 155 through which the upper end of the shaft 68 extends. This extension constitutes a bearing for the upper end of the shaft 68. Extending laterally from the extensions 155 and threaded therein, is a screw 156 having an enlarged head portion 157. The enlarged head portion 157 extends through a slot 158 (Figures 2 and 3) in an element 160. The element 160 is spaced from the extension 155 by means of a collar 161. This element 160 has a hook portion 162, as shown in Figure 2, adapted to engage the head of the screw 152 to prevent the lowering of the clutch element 140 with the movement of the arm 139, and thus preventing the rotation of the roll 40. This element 160, as best shown in Figure 2, is provided with an operating rod 163 extending through the wall of the casing 42 and provided at its outer end with a handle 165. Thus it will be apparent that we have provided a mechanism for locking the roll 40 against operation. The screw 143 is so arranged with respect to the slot or aperture 142 that upon the initial movement of the arm 134, the crank arm 139 will gravitate therewith until the clutch element 140 is in engagement with the element 95, at which time the arm 139 will remain still while the arm 134 continues the rest of its movement, the screw 143 moving in the elongated arcuate slot 142. In other words, the screw 143 in reality holds the arm up until the clutch element 140 rests on element 95, at which time the arm 134 moves relative to arm 139. This arrangement will permit of the operation of the ironing shoe to be hereinafter described independently of the roll 40, should it be desired to press garments, or the like, where no feed is desired.

Referring to Figure 14, it will be obvious that the end of the part of the shaft designated by the reference character 135' is journalled in a pair of brackets 170 and 171 of a casting 172. This casting 172 is disposed immediately below the top of the support 22, and is secured to this support by suitable bolts and nuts. The casting 172 is angular in construction, preferably of a right angle, and serves to reenforce the support 22. This casting 172 is equipped with a pair of extensions 173 and 174 to which the motor 58 is fastened. Also secured to the casting 172 is a cover or guard 175 for the coupling 57. One end of this casting 172, as best shown in Figures 2 and 4, is secured to the side of the casing 42.

We shall now proceed to describe in detail the ironing shoe construction of our invention which is best illustrated in Figures 11, 12 and 13 of the drawings. Associated with the shaft 135' is a supporting arm 176 for the ironing shoe 180. One end of the shoe arm 176 is bifurcated, as shown at 177. The legs 178 and 179 of this bifurcated arm 176 are loosely journalled on the shaft 135' intermediate the brackets 170 and 171 of the casting 172. This end of the arm 176 extends through the aperture 45 in the top of the support 22. Positioned adjacent the shoe arm 176 is an adjusting arm 181, which has an end 182 positioned intermediate the legs 178 and 179 of the arm 176. The end 182 of this adjusting arm 181 is secured to the shaft 135', whereas the legs 178 and 179 of the arm 176 are loosely mounted on the shaft 135'.

The adjusting arm 181 has a cylindrical portion 183 which extends into a square aperture 184 in the lower part of the arm 176. The circular end 183 of the arm 181 is provided with a circular bore 186 which is disposed in axial alignment with a second bore or opening 185. The two openings 185 and 186 are connected by a smaller aperture 187 (Figure 11). Located in the opening 185 is a compression spring 188 which abuts a washer 189 on a bolt 190. The end of the bolt 190 is threaded into a member 191 which is loosely guided in the opening 187. One end of this member 191 is bifurcated and equipped with a pin 192.

Pivotally connected to the arm 176 is a release lever 193. The lower end of this release lever is pivotally mounted upon a pin 194 carried by the arm 176, as is evident from Figure 11. Formed integral with the pivoted end of the arm 193 is a hook 196 adapted to fit over the pin 192 of the member 191. From the foregoing, it will be apparent that the arm 176 is resiliently connected to the adjusting arm 181, and that any movement of the arm 181 will cause a corresponding movement on the part of the arm 176 through the compression spring. The compression spring 188 serves to cushion the arm 176 when the shoe engages an article being ironed. Secured to one side of the arm 176 (Figure 12) is a lever 198 for moving the arm 176. The lower end of this lever 198 fits in a boss 199 formed integral with the side of the arm 176. This end of the lever 198 may be secured to the boss 199 by means of a set screw 200.

The shoe 180 is adjustably fastened to the upper end of the arm 176. The shoe includes a hollow casting 201, which may be of any suitable material such, for example, as aluminum. The casting 201 is provided with an arcuate shaped surface 202 which is adapted to fit over the curved surface of the ironing roll 40. As shown in Figure 13, secured to the casting 201, intermediate its ends, is a swivel block or mounting member 203 which is preferably bolted to said casting. The upper end of the arm 176 is adjustably secured to the block 203 by means of a pair of bolts 204 and 205 threaded into the block 203. These bolts extend through enlarged apertures 206 and 207, respectively (Figure 11), which enlarged apertures permit of the adjustment of the arm with respect to the shoe. It should be noted that the block 203 is provided with an arcuate or convex surface 209 adapted to co-operate with an arcuate or concave surface 210 formed in the upper end of the arm 176. Thus, it will be seen, that we have provided a universal connection between the arm and the shoe. Associated with the casting 201 is a shield or cover 211 which encloses the electrical heating means for the shoe. This cover may be made of any suitable sheet material, but we preferably make it of an aluminum sheet. It is, of course, to be understood that the shoe 180 may be heated by means of any other agency such, for example, as gas, without deviating from the features of our invention.

Now, obviously, by releasing the arm 176 from the adjusting arm 181 by means of the lever 193, the arm 176 is free to gravitate to bring the shoe to an unengaged position with respect to the roll 40. That is to say, when the shoe 180 is in engagement with the surface of the roll 40, by operating or manipulating the lever 193 the shoe can be immediately disengaged from the roll due to the fact that the lower end of the arm 176 is loosely mounted upon the shaft 135'. Moreover, as was previously pointed out, the operating force for moving the shoe is transmitted through the adjusting arm and the spring 188 associated with the shoe arm. Thus the arm and the shoe 180 will be at all times resiliently urged towards the roll 40 when the shoe is in an ironing position. The arm 198, or rather the control rod 198, is adapted to be utilized for the purpose of moving the shoe and arm 176 back into co-operation with the roll 40 after the same has once been released from the adjusting arm 181 through the manipulation of the lever or arm 193. The rod 198 is, in reality, adapted to move the shoe arm assembly as a unit to and from the roll 40, as is obvious from the disclosure in the drawings.

Referring now to Figures 2, 10, 16 and 17 we shall describe our novel feed board support construction as well as the associated clothes hanger. Positioned adjacent the periphery of the ironing roll 40 is a feed board, designated generally by the reference character 215. This board is preferably located in a horizontal plane and is adapted to support the clothes or garments being fed into the ironing machine intermediate the roll and the shoe. Fastened to the underside of this board 215 is a supporting bracket 216 comprising a bent rod. This bracket or rod 216 is secured at one end to a pivotal member 217 having a pair of lateral extensions 218 and 219. Also it will be noted that the upper leg of the U shaped rod 216 passes through sleeves 216² and 216³ secured to the under face of the board adjacent the back edge thereof. These sleeves permit of the board being pivoted about the upper leg of rod 216. Formed integral with the casing 42 are a pair of projections 220 and 221 adapted to co-operate with the extensions 218 and 219 of the member 217. In fact, as is obvious from Figure 10, the extensions 218 and 219 are pivotally attached to the projections 220 and 221 by means of pins 222 and 223, respectively. Thus it will be seen that the board 215 is adapted to be swung about the pivot pins 222 and 223 away from the roll 40 to afford access to the periphery of the roll.

Figure 17:
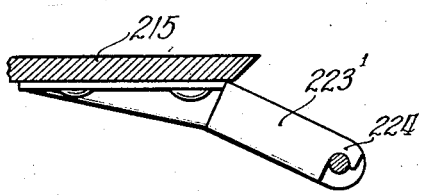
Figure 17 is a detail view of the clip associated with the ironing board and adapted to co-operate with the end of the shaft illustrated in Figure 16 for the purpose of supporting the ironing board.

The other end of the board 215, as best shown in Figures 16 and 17, has secured thereto an arm 223' provided at its end with a hook portion 224 adapted to fit over the end of the shaft 71 (Figure 16). It will be apparent that by lifting this end of the board a slight distance, the hook portion 224 may be moved out of co-operation with the end of the shaft 71 and the board may, thereafter, be pivoted about the pins 222 and 223. The arm 223' merely serves to provide additional support for the board 215.

Also fastened to the underside of the board 215 is a bracket 230 (Figure 10) which has pivotally secured thereto one end of a clothes support 231. The clothes support 231 is adapted to be pivoted about the bracket 230 to a position at right angles to the roll 40. The board 215 and the clothes support 231 are maintained in a horizontal plane by means of a pivotal element 232, the upper end of which is adapted to abut a portion 233 of the bracket 230 (Figure 2). The lower end of this element 232 as shown in Figures 2 and 10, is provided with a lateral extension 235 extending through an aperture 236 in the bracket 217. When it is desired to move the board 215 away from the roll 40, the upper end of the element 232 is moved out of engagement with the board by swinging it outwardly therefrom. Thus it will be seen that we have provided a simple and efficient way of maintaining the ironing board 215 in its proper position.

In Figures 18 to 22, inclusive, we have illustrated our novel mechanism for locking the switch controlling the motor against operation, as long as the shoe is in engagement with the roll. The mechanism comprises a casing 240 in which is disposed a pair of electrical snap switches 241 and 242. These switches may be of any conventional construction and each includes an operating member 243—243'. The switch 241 serves to control the electrical heat element in the shoe 180. The shoe switch members 243 and 243' extend through apertures 244 and 245 in the top of the casing 240. Connected to the side of the casing 240 is an electrical plug 246 by means of which the electrical switches 241 and 242 are connected to an electrical circuit of the ironing machine. The switch 242 controls the stopping and starting of the motor 58.

The switch casing 240, as best illustrated in Figure 10, is fastened to the underside of one end of the support 22. The two operating members 243 and 243′ extend through suitable apertures in the top of the support 22. Now, when the table top is swung back clear of the ironing machine, access is afforded with facility to the two switch operating members 243 and 243′ for the purpose of operating the ironing mechanism. Positioned intermediate the top of the switch 242 and the casing 240 is a reciprocable element 248, which is illustrated in perspective in Figure 22. This element includes a pair of lateral ears 249 and 250 which extend downwardly over the sides of the switch 242. The element 248 has an aperture 251 for receiving the switch operating member 243′. In other words, the switch operating member 243′ extends upwardly through the aperture 251. Also, the extension 250 of the member 248 is provided with a lug 252 having an aperture 253. Connected to the lug 252 is one end of a lever 255. The lever 255 is connected to the lug 252 by means of a pivot pin 256 extending through the aperture 253. The lever 255 is pivoted intermediate its ends to a lug 257 formed integral with the wall of the casing 240. The lowermost leg of the lever 255 is bent laterally and has formed integral therewith a lateral extension 258. The extension 258 (Figure 2) is adapted to be engaged by one end of a pin 260 which extends through the wall of the gear casing 42 and has its other end in engagement with the periphery of the cam portion 93 of the member 90.

Now, it will be apparent that when the member 90 is rotated one-half a revolution to move the shoe into engagement with the roll, the cam 93 will cause the pin 260 to be moved outwardly, thus pivoting the lever 255 about its pivot. The upper end of this lever 255 will move the member 248 over the "on" portion of the switch 242 until its edge 261 engages the side of the operating member 243′, thus locking this member against operation and preventing the motor 58 from being turned off. It will be understood that if it were not for this member 248 the motor might be turned off accidentally while the heated shoe is still in engagement with the roll 40. Obviously, if such a thing happened the roll would be stopped from turning and the heated shoe would burn the padding 41 thereon. Through our invention it is impossible to turn off the motor until the shoe is moved away from the roll by the operating mechanism previously described.

The operation of our ironing machine described above is briefly as follows:—

The operator, in order to have access to the machine, merely moves the table cover 21 about its pivot bolts until it is in the position illustrated in Figure 11. Then, by actuating the switch lever 243 of the switch 241 the source of electrical energy may be connected to the shoe 180 for the purpose of heating the same. The board 215 is moved upwardly from the position illustrated in Figure 2 to the dotted position. This movement is permitted due to the fact that the bracket or rod 216 is pivotally connected to the underside of the board adjacent the inner edge thereof, as is obvious from the illustration in Figure 10. The element 232 is then swung into the position shown in Figure 10 to support the board in a horizontal position. Also, the supporting arm 223′ is brought into co-operation with the end of the shaft 71, as previously described.

The work to be ironed is placed on top of the board 215 in proximity to the periphery of the ironing roll 40. The operator then sets the motor 58 into operation by moving the switch member 243′ of the switch 242 from its "off" position to a closed position. In order to move the shoe 180 into engagement with the ironing roll and to also cause the ironing roll to be revolved, it is necessary to operate the mechanism in the casing 42. This is done by depressing the operating button 115 which, through the button rod 114, causes the member 90 to make a half revolution and connects the shaft 68 to the shaft 60, thus causing the shoe to be moved into engagement with the roll and causing the roll to be revolved. The roll 40, in revolving, brings the work under the ironing shoe 180. The ironed work drops into the concave portion 44 of the top of the support 22.

As previously described, the member 90 in making a half a revolution causes the switch 242 to be locked against operation, thus preventing the motor 58 from being rendered inoperative. Should, however, the operator desire to remove the shoe from co-operation with the roll, it may be done by manipulating the lever 193 to disengage the arm 176 from the adjusting arm 181. This will permit the shoe 180 to gravitate to the position illustrated in Figure 2 without interfering with the rotation of the ironing roll. In order to move the shoe back into engagement with the roll, the operator takes hold of the rod 198 and moves the shoe bodily forward until the hook portion 196 can be engaged with the pin 192 to connect the arm 176 to the arm 181.

Upon the completion of the ironing job, the operator by depressing the button 115 causes the member 90 to revolve a half revolution until it attains its original position, at which time the shaft 68 will be disconnected from the shaft 60 and the shoe 180 will be automatically moved out of engagement with the roll 40. When the shoe is moved away from the roll 40, the switch 242 may be operated to render the motor 58 inoperative.

Now, should the operator desire to use the ironing shoe in conjunction with the roll 40 without operating the roll 40, it is necessary that the rod 165 be pulled outwardly away from the casing 42. This will result in the arm 139 being locked against gravitation, thus preventing the clutch element 140 from being moved into engagement with the clutch element 95. The operator by starting the motor and taking hold of the rod 198, may move the shoe into engagement with the roll. This arrangement is ideal in those cases where it is desired to press a garment without the use of a feed, thus rendering it unnecessary to have a revolving roll.

It is, of course, to be understood that instead of employing the button 115 to operate the mechanism in the casing 42, the operator may, by moving the lever portion 125, set the mechanism into motion through the rod 115'. This lever is so situated as to be readily operated by the operator's knee, providing a very simple and efficient means for controlling the machine at such times as the button 115 can not be easily reached.

We shall now proceed to describe in detail the modification of our invention illustrated in Figures 23 to 28, inclusive. This form of the invention is substantially like that illustrated in Figures 1 to 22, inclusive, but differs therefrom in the operating mechanism associated with the casing 42 and in the control mechanism for actuating the said operating mechanism. In view of the fact that this form of the invention is substantially like the described modification, we have used the same reference characters in the two modifications for designating identical parts. It is believed that the description already given will suffice for the identical parts of the two forms of our invention, and hence we will only describe hereinafter in detail the mechanism in the present modification not found in the first form.

In Figure 27 we have illustrated a construction somewhat analogous to that shown in Figure 3. The operating mechanism disclosed in Figure 27 differs from that shown in Figure 3 in the mechanism associated with the shaft 60. It also differs from the arrangement in Figure 3 in that the shaft 71' is tubular, whereas the shaft 71 in Figure 3 is a solid shaft. The vertical shaft 60 extends upwardly from the casing 52 into a casing 42'. The casing 42' is substantially like the casing 42, but differs therefrom in that it has formed integral therewith an enlarged boss 67' which serves as a bearing for the shaft 60. It also has formed integral therewith a boss 64' which extends downwardly into the casing 52. The boss 67' has formed integral therewith a sleeve portion 115³, which extends upwardly around the vertical shaft 60.

Surrounding the sleeve portion 115³ is a member 90' having an eccentric portion 92' which is substantially like the eccentric portion 92 of the first form of mechanism. This eccentric portion is surrounded by the strap 130 of the arm 131. The member 90' is provided with a cam portion 93', which serves to actuate the pin 260 in the same manner as the cam portion 93 in the first form. The top of the member 90' is provided with a pair of cam surfaces 94'. Also the extreme end of the member 90' is provided with a plurality of clutch teeth 112' which are adapted to co-operate with clutch teeth 97' of a member 108'. The member 108' is splined upon the shaft 60 and is adapted to be moved axially on the shaft, as will become more apparent hereinafter. Also secured to the shaft 60 is a clutch element 95' having clutch teeth 99' adapted to co-operate with the clutch teeth 150 of the member 140, which is the same as the member in the principal form of the machine.

As best shown in Figure 26, associated with the wall of the casing 42' is a shaft 300. The shaft 300 is supported at its ends by brackets 301 and 302. Associated with the bracket 301 is an arm 303 which surrounds the shaft 300. This arm 303 is provided with a bifurcated or fork end 304 which straddles the member 108' immediately below the annular shoulder 117' thereof. The arm 303 is provided with a clutch or dog surface 305 adapted to co-operate with a corresponding surface 306 on an arm 307, also mounted upon the shaft 300. Positioned intermediate the arm 307 and the bracket 302 and surrounding the shaft 300 is a compression spring 308. The free end of the arm 307 is bifurcated, as indicated at 309, and this bifurcated end 309 pivotally carries a roller 310 adapted to engage the cam surfaces 94' of the member 90'. One end of the spring 308 is secured to the bracket 302 and the other end, which is designated by the reference character 311, fits over the top of the free end of the arm 307. This spring is adapted to at all times urge the arm 307 downwardly into engagement with either of the two cam surfaces 94'.

In Figure 27 we have illustrated a crank lever 315 pivoted at 316 to the side wall of the casing 42'. The vertical leg 317 of this lever 315 extends downwardly into co-operation with the arm 307. In other words, the lower end of the leg 317, designated in Figure 26 by the reference character 318, extends into an aperture 319 in the hub of arm 307. Now, obviously, by actuating this crank lever so that the leg 317 will be moved towards the spring 308, the clutch surface 306 will be moved out of engagement with the clutch surface 305, compressing the spring 308. Immediately thereafter, as will be more fully explained hereinafter, the arm 304, due to gravity, drops and the clutch element 108' falls therewith, causing the teeth 97' to engage the teeth 112' operatively connecting the member 90' to the shaft 60.

Figures 23, 24:
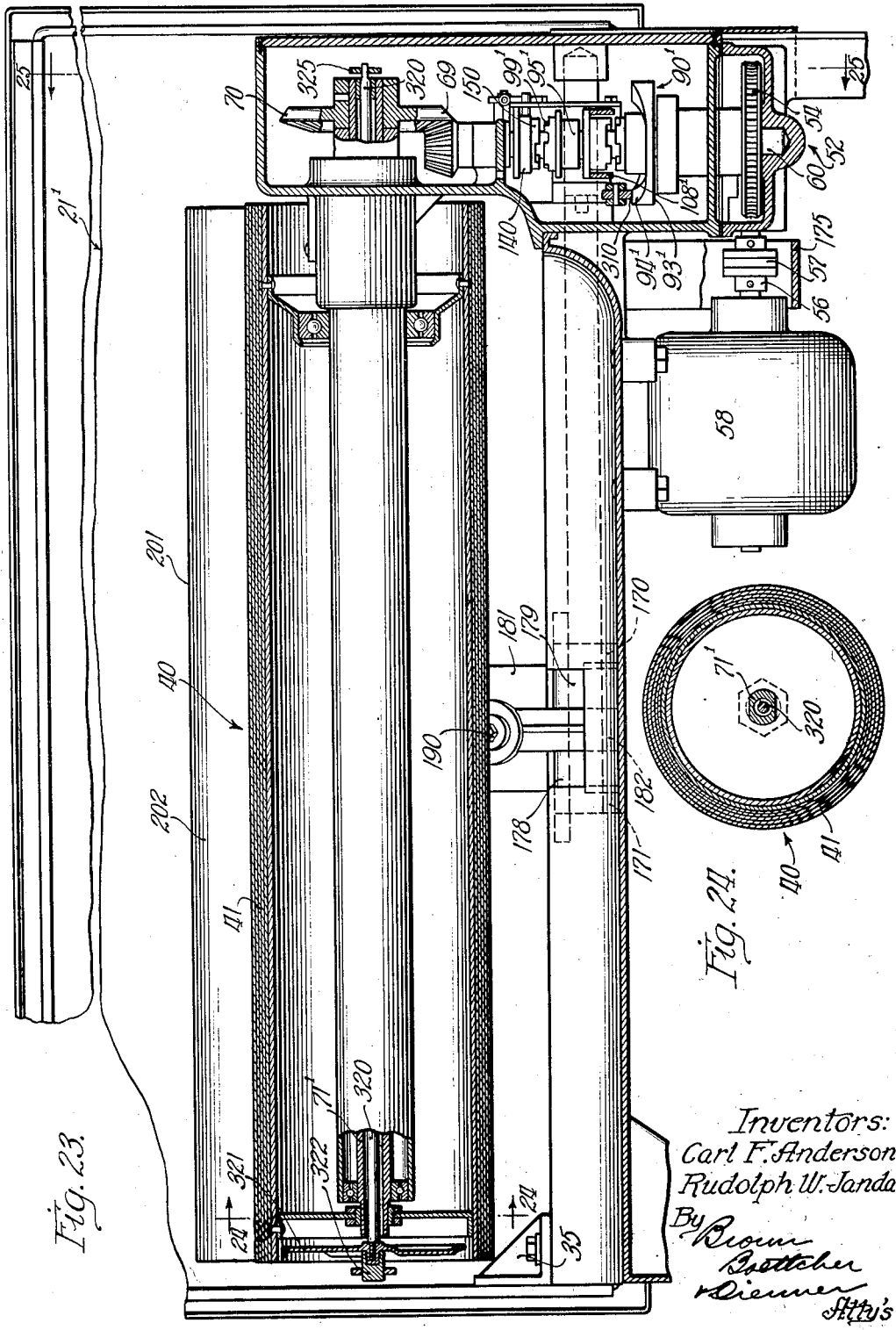
Figure 23 is a view similar to Figure 10 of a modification of our invention.
Figure 24 is a sectional view taken on the line 24—24 of Figure 23.

As previously pointed out, the shaft 71' is purposely made tubular. Extending through the bore of this tubular shaft 71' is a rod 320 which is clearly shown in Figures 23 and 27. One end of this rod 320, as shown in Figure 23, is provided with a disc wheel 321 which is secured thereto. By operating the disc wheel 321 the rod 320 may be turned for a purpose to be hereinafter explained. Also, secured to the end of the rod 320 is a threaded member 322 which is adapted to co-operate with the arm 223' to support the feed board 250, in much the same manner as previously described in connection with the first form of the machine.

Secured to the end of the rod 320, shown in Figure 27, is a laterally extending arm 325 having a forked or bifurcated lateral extension 326. Extending through this forked end 326 is the vertical button rod 114' which carries at its upper end a button 115² extending through an aperture in the top of the casing 42'. The button rod 114' is provided at 328 with a kink or bend disposed immediately below the forked end 326. The purpose of this kink 328 is to permit the button rod 114' to be depressed without interfering with the arm 325. The kink 328, however, causes the button rod 114' to be actuated whenever the arm 325 is moved downwardly by reason of the turning of the operating rod 320. In other words, by turning the disc 321 at the other extremity of the roll 40, the operating rod 320 may be actuated to cause the button rod 114' to be moved downwardly in the same manner as if the button 115² was depressed. The lower end of the button rod 114' is connected to the other leg 332 of the crank 315. The remaining mechanism associated with this modification is substantially identical to that described in connection with the first form of our invention.

The operation of this form of our invention is much the same as the operation of the first modification. Since this form of the invention differs in the mechanism employed for connecting the cam and eccentric members to the shaft 60, we shall describe briefly the operation of the mechanism associated with the said shaft 60.

Now, obviously, upon the actuation of the button rod 114', the bell crank 315 will be actuated to move the dog or clutch surface 306 out of engagement with the dog or clutch surface 305 (Figure 26). This results in the compression of the spring 308. It should be noted that the spring 308 performs two functions, namely, the function of at all times urging the roller 310 into engagement with either of the two cam surfaces 94', and the function of returning the arm 307 to its initial position when the dog or clutch surface 306 is properly aligned with the dog or clutch surface 305. Immediately upon the disengagement of the two dog or clutch surfaces, the end of the arm 303, due to gravity falls, and the clutch element 108' gravitates therewith. This results in the teeth 97' of the clutch element 108' engaging the teeth 112'. Since the element 108' is keyed to the shaft 60, the member 90' will be caused to revolve one half a revolution, at which time the roller 310 will reach the high spot of the other cam surface 94'. This will result in the elevation of the forked end 304, disengaging the clutch teeth 97' from the clutch teeth 112'. In other words, upon the roller 310 reaching the low spot on the cam surface, the dog or clutch surface 306 will become aligned with the teeth 305 of the arm 303. Spring 308 will immediately react to engage the two arms 303 and 307. Obviously, upon the roller 310 traversing the other cam surface 94' (Figure 26), it will cause the gradual elevation of the forked end 304 disengaging the previously mentioned clutch teeth and stopping the rotation of the member 90'. It will be evident that during this one half a revolution of the member 90' the eccentric portion 92' will be effective to actuate the arm 131 in the same manner as the eccentric portion 92 in the first form of our invention. This will result in the shoe being moved into engagement with the roll, as described previously.

Now when it is desired to move the shoe out of engagement with the roll 40, the button rod 114' is again actuated, causing the member 90' to make another half a revolution in much the same manner as previously described. This will result in the arm 131 being returned to its initial position.

In Figures 29, 30 and 31, we have illustrated a modified form of release for the arm associated with the shoe 180. The arm 176' of the shoe is provided at its lower end with a pair of extensions 340 and 341, which are loosely mounted upon the actuating shaft 135'. This shaft 135' is supported by brackets 170' and 171' of a casting 172' disposed immediately below the support 22. The arm 176' extends through the aperture 45 in the support. Positioned intermediate the extensions 340 and 341 is an arm 342 which is also loosely mounted upon the shaft 135'. This arm 342 is provided with an enlarged end 343, which is furnished with a circular aperture 344. Secured to the shaft 135', intermediate the bracket 171' and the extension 340, is an arm 345 having an enlarged end 346 disposed immediately over the enlarged end 343 of the arm 342. This enlarged end is provided with an aperture 347 in axial alignment with the aperture 344. The shank of a bolt 348 extends through the two apertures.

It should be observed that the upper end of the bolt 348 is rigidly secured to the enlarged end 346 of the arm 345. Positioned intermediate the enlarged end 343 and the head of the bolt 348 is a spring 350, preferably of the compression type. Now, when the shaft 135' is actuated, the arm 345 is drawn upwardly for transmitting force to the arm 342 through the spring 350.

Also formed integral with the arm 342 is an extension 351 which has a slot 352. Formed integral with a side of the arm 176' is a boss 353 in which is threaded a pivot bolt 354. Surrounding this pivot bolt 354 is a pivotal element 355 into which is threaded the lower end of an operating arm or rod 356. Formed integral with the lower portion of the element 355 is a projection 357 adapted to fit in the slot 352 in the extension 351 of the arm 342.

The operation of this modified form of release mechanism is briefly as follows:—Upon the actuation of the shaft 135' by the operating mechanism of the ironing machine, movement is imparted to the arm 176' through the spring 350, which serves to cushion the shoe in its movement. After the shoe has been moved into engagement with the roll 40, the shoe 180 is adapted to accommodate itself to variations in the thickness of the material being ironed, due to the resilient mounting associated therewith, namely, the spring 350.

Should, for any reason, the operator desire to immediately release the shoe 180 from co-operation with the roll 40, the same may be accomplished by moving the rod 356 in a lateral direction to disengage the projection 357 from the slot 352 in the extension 351. Now, since the arm 176' is mounted independently of the arm 342, and is relatively top-heavy, it will gravitate to the disengaged position illustrated in Figure 29. When the operator desires to return the shoe 180 into co-operation with the roll 40, the same may be done by moving the shoe toward the roll by means of the rod 356 and again engaging the projection 357 with the extension 351.

Now we desire it understood that although we have illustrated and described in detail several modifications of our invention, the invention is not to be limited thereby, but only in so far as defined by the scope and spirit of the appended claims.

We claim:—

1. In an ironing machine, a roll adapted to be revolved, a shoe adapted to be moved into co-operation therewith, means including an electric motor for actuating the said roll, an electrical switch including a manually operable switch finger for enabling the motor to be turned off and on, and means for automatically locking the said switch in closed position when the shoe is in operative relation to the roll, said means comprising a reciprocable lock element adapted to engage the switch finger to lock it in a closed position, a lever pivoted intermediate its ends and connected at one end to the reciprocable element, and a cam associated with the shoe operating mechanism for co-operating with the other end of the lever to move the same about its pivot.

2. In an ironing machine, a revolvable roll, a shoe adapted to be moved into co-operation therewith, a switch cover member, an electrical switch associated with said member and including a manually operable switch finger extending through an aperture in the cover member, said switch being adapted to control the operation of the roll, a reciprocable lock element disposed intermediate the switch and the cover member for locking the finger in a given position, a lever pivoted intermediate its ends having an end connected to the reciprocable lock element, and means controlled by the shoe operating mechanism for actuating the lever member to lock the said switch finger in a given position.

3. In an ironing machine, an ironing roll, a shoe co-operable therewith, and operating mechanism for said roll and shoe including a pair of axially aligned shafts, driving means connected to one of said shafts, means connecting the other shaft to the roll, means for moving the shoe into and out of engagement with the roll, clutch mechanism for connecting said last mentioned means to said driving means, a clutch connecting the two shafts together to operate said roll, and means for connecting said shoe operating means to said clutch adapted to operate said clutch contemporaneously with the operation of said shoe.

4. In an ironing machine, an ironing roll, a shoe co-operable therewith, and operating mechanism for said roll and shoe including a pair of axially aligned shafts, driving means connected to one of said shafts, means connecting the other shaft to the roll, means connecting one of the shafts to the shoe for operating the same, and means controlled by said shoe operating means for connecting the two shafts together to operate the roll.

5. In an ironing machine, an ironing roll, a shoe co-operable therewith, and operating mechanism for said roll and shoe including a shaft connected to the shoe for moving the same, an arm rigidly secured to the shaft, a second arm loose on the shaft and having a lost motion connection with the first arm, driving means, a clutch for connecting the roll to the driving means, means connecting the arm loosely mounted on the shaft to the clutch, and means for connecting said first arm to and disconnecting it from said driving means, the lost motion connection between the arms, permitting operation of said connecting and disconnecting means independently of said clutch.

6. In an ironing machine, an ironing roll, a shoe co-operable therewith, and operating mechanism for said roll and shoe including a shaft connected to the shoe for moving the same, an arm rigidly secured to the shaft, driving mechanism connected to the arm for actuating the shaft, a second arm loosely mounted on the shaft, a lost motion connection between the two arms, clutch means for connecting the roll to the driving means, and means connecting the clutch means to the end of the second arm loosely mounted on the shaft, said second arm being adapted to be moved by gravity in one direction upon the actuation of the fixed arm and to be moved in the other direction by the arm secured to the shaft, and means operable at will to maintain the clutch disengaged.

7. In an ironing machine, a roll, a shoe movable toward and away from the roll, a motor, means for establishing driving connections between the roll and the motor, releasable means for establishing operating connections between the motor and the shoe for moving the latter into and out of operative position, clutch means for disconnecting the shoe from the motor when said shoe is moved into its extreme position in each direction, a motor control member, and means actuated by said clutch means for locking the motor control member in operative position while the shoe is in operative relation to the roll.

8. In an ironing machine, a roll, a motor, a shaft driven from said motor, a rockably mounted shoe operating shaft, a shoe connected to the shaft to be moved thereby toward and away from the roll, an eccentric disposed about the driven shaft and having operating connection with the shoe operating shaft, a second shaft having driving connection with the roll, clutch means operated by the eccentric for connecting the second shaft to the driven shaft and disconnecting it therefrom, said means including a lost motion connection permitting operation of the eccentric without operating said clutch means, means for optionally holding the clutch means in inoperative position, and means for establishing driving connection between the eccentric and the driven shaft and for releasing the eccentric when the shoe has been moved into its extreme position in either direction.

9. In an ironing machine, a roll, a motor, a shaft driven from the motor, a second shaft having driving connection with the roll, a rockably mounted shoe operating shaft, a shoe, yielding connections between the shoe and said operating shaft, an eccentric disposed about the driven shaft, operating connections between said eccentric and the shoe operating shaft, means for connecting the eccentric to the driven shaft and for disconnecting it therefrom when the shoe reaches its extreme position in either direction, means for causing the reestablishment of the operating connections between the eccentric and the driven shaft, and means for establishing driving connection between said second shaft and the motor driven shaft, the last mentioned means being movable into inoperative position independently of the operation of the eccentric permitting operation of the shoe while the roller is inoperative.

10. In an ironing machine, a roll, a motor, a shaft driven from said motor, a second shaft having driving connection with the roll, a rockably mounted shoe operating shaft, a shoe mounted on said shaft for movement therewith toward and away from the roll, a yielding connection between the shoe and its shaft, means including an eccentric for establishing operating connections between the shoe operating shaft and the driven shaft and for disconnecting the two shafts when the eccentric has been moved into its extreme operative position in either direction, means for establishing driving connection between the motor driven shaft and said second shaft, a control switch in the motor circuit, and means actuated by the eccentric for locking the switch in motor circuit closing condition when said eccentric is in position to hold the shoe in operative relation to the roll.

11. In an ironing machine, an ironing roll, a shoe cooperable therewith, and operating mechanism for said roll and shoe including a pair of axially aligned shafts, driving means connected to one of said shafts, means connecting the other shaft to the roll, an eccentric member loosely mounted on one of the shafts, means connecting said eccentric member to the shoe, clutch means for connecting the two shafts together, a bell crank having one arm connected to the clutch means, means connecting the other arm of the bell crank to said eccentric member to cause the clutch means to be operated contemporaneously with the operation of the shoe, and clutch means for connecting said eccentric member to the associated shaft to operate said means and bell crank and for disconnecting the eccentric member from its shaft when said eccentric member has been turned into its extreme position in each direction.

12. In an ironing machine, an ironing roll, a shoe cooperable therewith, and operating mechanism for said roll and shoe including a pair of axially aligned shafts, driving means connected to one of said shafts, means connecting the other shaft to the roll, an eccentric member loosely mounted on one of said shafts, means including a crank arm for operatively connecting said eccentric member to said shoe, clutch means for connecting said two shafts together, a bell crank having one arm connected to said clutch means, means connecting the other arm of the bell crank to said eccentric member to cause said clutch means to be operated contemporaneously with the operation of the shoe, and means for connecting said eccentric member to its associated shaft including a toothed element secured to said shaft, a detent pivotally connected to said eccentric member and adapted to engage said toothed element, means urging the detent in operative direction, a tripping member normally disposed to trip out the detent and hold it in inoperative position after the eccentric member has been rotated to a predetermined extent, and means for moving said tripping member into inoperative position.

13. In an ironing machine, an ironing roll, a shoe cooperable therewith, and operating mechanism for said roll including a pair of axially aligned shafts, driving means connected to one of said shafts, means connecting the other shaft to the roll, clutch means for connecting the two shafts together, an eccentric member mounted on one of said shafts, an arm connected to said eccentric member, a shaft for operating said shoe, a crank arm connecting said arm to said shoe shaft, a clutch shift arm connecting the shoe shaft to said clutch means, and clutch means for connecting said eccentric member to its associated shaft.

14. In an ironing machine, an ironing roll, a shoe cooperable therewith, and operating mechanism for said roll, means for moving the shoe to and from the roll including a toothed element secured on a shaft, an eccentric member loosely mounted on the shaft, a detent pivotally connected to the eccentric member and adapted to engage the toothed element, means urging the detent into operative position, and a trip member movable into and out of operative position for moving the detent about its pivot on the eccentric member for releasing said eccentric member from its associated shaft.

15. In an ironing machine, an ironing roll, a shoe cooperable therewith, and operating mechanism for said roll and shoe, said shoe operating mechanism including an eccentric member loosely mounted on a shaft, a toothed element secured to the shaft, a detent pivotally connected to the eccentric member, said detent including a pair of diverging arms cooperable with said toothed element, resilient means for at all times urging the detent in a given direction, a movable member adapted to normally counteract the resilient means to hold one of the legs of said detent out of cooperation with said toothed element, and means for temporarily releasing said movable member from engagement with said detent to permit the detent to operatively connect said eccentric to said shaft, said movable member being adapted to move back into its normal position to be in a position to disengage the detent from said eccentric member after the latter had made one-half of a revolution.

In witness whereof, we hereunto subscribe our names this 26th day of November, 1927.

CARL F. ANDERSON.
RUDOLPH W. JANDA.